United States Patent [19]

Suzuki

[11] Patent Number: 4,786,921
[45] Date of Patent: Nov. 22, 1988

[54] RECORDING APPARATUS
[75] Inventor: Yasuhito Suzuki, Kawasaki, Japan
[73] Assignee: Canon Kabushiki Kaisha, Tokyo, Japan
[21] Appl. No.: 139,117
[22] Filed: Dec. 28, 1987

Related U.S. Application Data

[63] Continuation of Ser. No. 69,208, Jul. 1, 1987, abandoned.

[30] Foreign Application Priority Data

Jul. 14, 1986 [JP] Japan ................................ 61-163821

[51] Int. Cl.⁴ ............................................ G01D 15/00
[52] U.S. Cl. .......................................... 346/150; 355/7
[58] Field of Search ...................... 346/150, 134, 136; 355/7, 3 SH, 14 SH, 24, 82; 400/579, 581; 226/20, 45

[56] References Cited

U.S. PATENT DOCUMENTS 4,496,983  1/1985  Takenaka .............................. 346/150
4,536,078  8/1985  Ziehn ................................ 355/14 SH
4,561,772  12/1985  Smith ............................... 355/14 SH Primary Examiner—Arthur G. Evans
Attorney, Agent, or Firm—Fitzpatrick, Cella, Harper & Scinto

[57] ABSTRACT

A recording apparatus includes a record unit for recording an image on a recording medium; a detector for detecting a binding hole of the recording medium; and a record control unit responsive to a detection of the binding hole by the detector for causing the record unit to record the image on the recording medium such that the image is not cut away by the binding hole, e.g., by moving the image relative to the recording medium.

10 Claims, 6 Drawing Sheets

RECORDING APPARATUS

This application is a continuation of application Ser. No. 069,208 filed July 1, 1987, now abandoned.

BACKGROUND OF THE INVENTION

Field of the Invention

The present invention relates to a recording apparatus for receiving image data inputted from an external equipment and recording the image data on a sheet of recording medium.

Related Background Art

In order to conserve printed recording medium, it is generally bound simply using a clip or using a binder with holes punched out.

FIGS. 6A and 6B are views used for explaining the conservation of recording medium.

In the Figures, an image is recorded within a printing area (indicated by a broken line) or recording medium 51. Holes 53 for binding purpose are punched out at the left side of the recording medium 51.

In a prevailing image forming by a recording apparatus, i.e., in an image forming with no consideration of how the medium is bound, the printing area 52 is symmetrically located at the center of the recording medium 51 as shown in FIG. 6A to obtain a good outward appearance of printed medium.

On the other hand, in the case of a recording medium 51 with holes, the printing area 52 must be moved parallel to the frame of the medium in the direction indicated by an arrow. Otherwise, if the medium 51 is bound with a binder, the printing area may overlap the holes 53 and the image at that portion is cut away, thus resulting in inconvenience in reading the printed contents.

Therefore, when a recording medium 51 with holes 53 is used, conventionally the operator controls print data so as to move the printed area 52 by a predetermined amount away from the positions of holes 53, as shown in FIG. 6B.

In this case, unless a recording medium 51 of a size suitable for such a moved printing area 52 is used, the predetermined move amount may become insufficient for printing without allowing the holes to cut the image. In addition, the printed image exhibits a poor outward appearance and is difficult to read since the moved position of the printing area 52 is not proper.

Of printing apparatuses now available, there is known a laser beam printer of type capable of printing image data using a different print format from the original format of the image data. In this case, it is necessary to store all the combinations of print formats and sizes of recording medium.

SUMMARY OF THE INVENTION

The present invention has been made to eliminate the above problems. It is an object of the present invention to provide a recording appratus capable of printing image data on a proper area of a recording medium by detecting the punched binding holes of the medium during the feeding operation.

This object is achieved according to the present invention by preventing a recording apparatus comprising binding hole detecting means for detecting a punched binding hole of a recording medium, and print control means for moving a printing area of said recording medium by a predetermined amount from said binding hole, said print control means moving said printing area by said predetermined amount from said hole detected by said binding hole detecting means.

DETAILED DESCRIPTION OF THE PREFERRED EMBODIMENT

The preferred embodiment of the present invention will be described with reference to the accompanying drawings.

Figure 1:
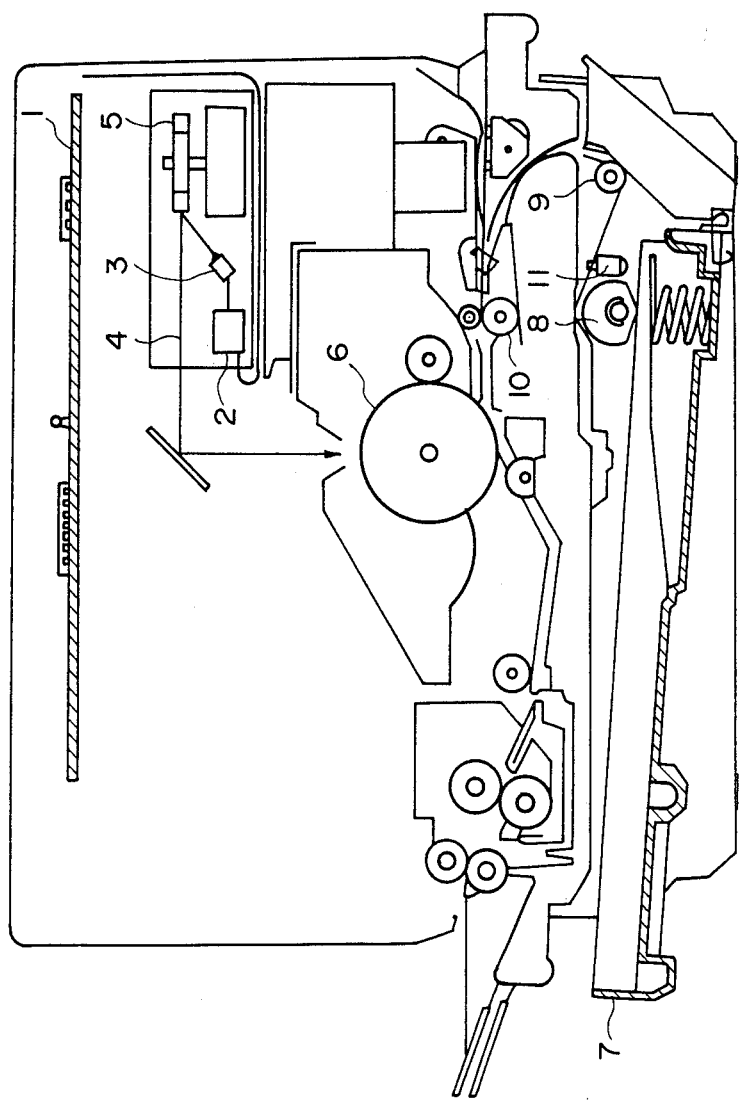
FIG. 1 is a side view, partially in section, of an embodiment of the recording apparatus according to the present invention.

FIG. 1 is a side view, partially in section, of an embodiment of recording apparatus, shown illustratively as a laser beam printer, according to the present invention. A control board 1 is used for controlling the printer, analyzing input data, generating image signals and so on. A laser diode driver 2 turns on and off the emission of a laser diode (LD) 3 in accordance with the image signal sent from the control board 1. A laser beam 4 is emitted from the LD 3. A scanner 5 mechanically scans the laser beam 4. The laser beam 4 is deflected by the scanner 5 and horizontally scanned to a drum 6 to form a latent image on the drum 5 by the known electrophotographing technology. A paper feed cassette 7 contains a recording medium such as recording paper. A paper feed roller 8 feeds a sheet of recording paper from the paper feed cassette 7. A guide roller 9 operates to correctly guide the recording paper to a paper feed passage. A resist roller 10 temporarily stops the recording paper and then feeds it to the image transfer position in synchronization with the image write operation to the drum 6. A binding hole sensor 11 constitutes binding hole means of this invention, which is constructed of a photodiode for example. The binding hole sensor 11 detects binding holes of a recording paper being fed, and sends a detection signal 11a to be described later to a CPU on the control boar 1.

Figure 2:
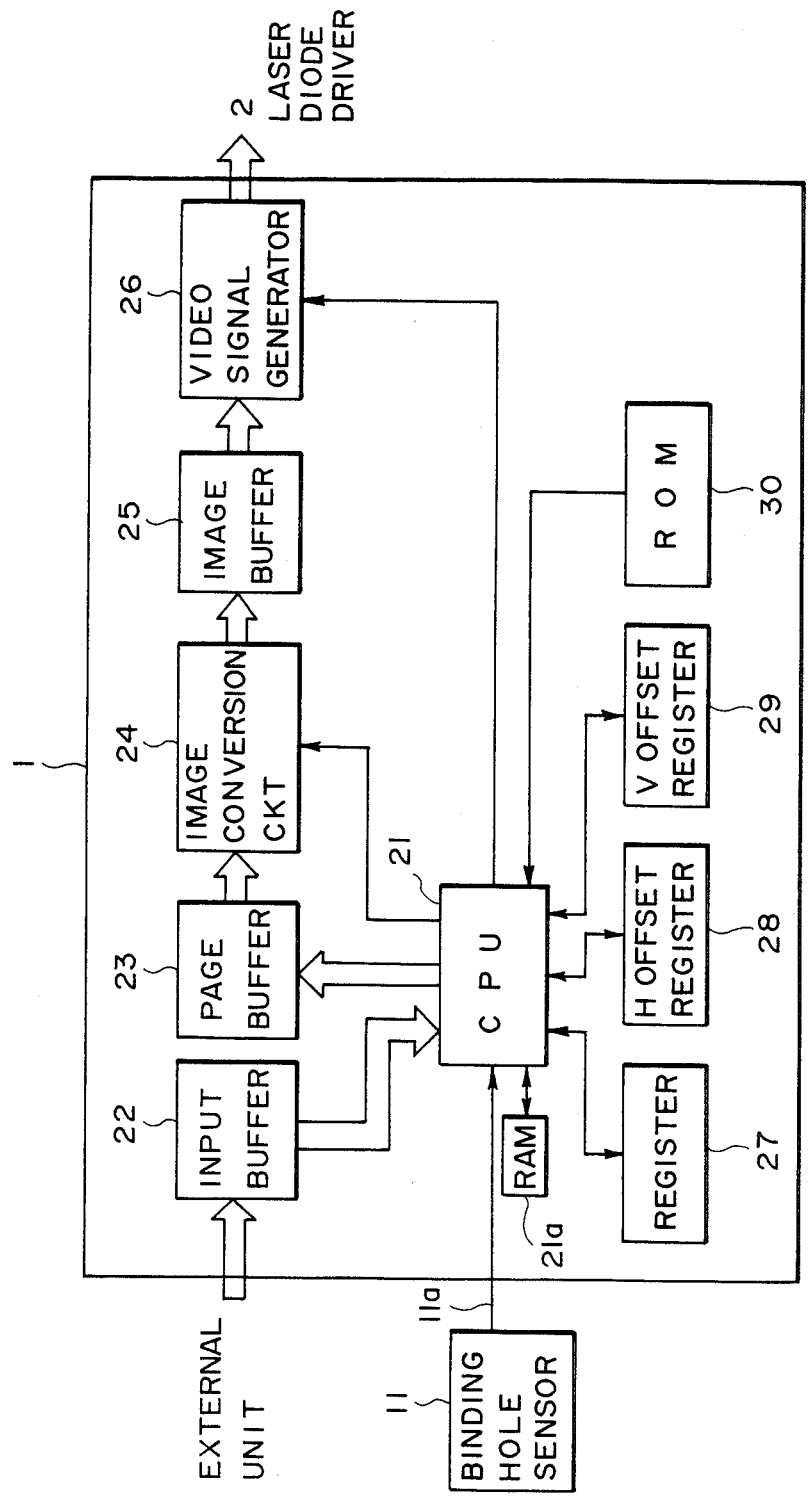
FIG. 2 is a block diagram showing the circuit arrangement of the control board shown in FIG. 1.

FIG. 2 is a block diagram showing the circuit arrangement of the control board 1 shown in FIG. 1. The CPU 1 controls the entire system of the recording apparatus, and analyzes input data sent from the external equipment such as a host computer. An input buffer 22 temporarily stores input data sent from the external equipment. A page buffer 23 stores print data which has been transformed from the input data in a format suitable for printed through the analysis by the CPU 21. An image development circuit 24 develops the print data in the page buffer 23 into a dot image. An image buffer 25 stores the dot image developed by the image development circuit 24. A video signal generator 26 converst the dot image of the image buffer 25 into a video signal. A CAP (Current Active Position) register 27 indicates a print position or CAP of a data now under analysis by the CPU 21. The CAP register 27 changes its contents in accordance with a change in print position caused by execution of a print position appointment command, line feeding, printing or the like. An H offset register 28 indicates a move amount of an image in the scan direction. A V offset register 29 indicates a move amount of an image in the recording paper feed direction. A read-only memory (ROM) 30 stores a program to be later described for the CPU 21.

Wide arrows in the Figure show a flow of image data to be printed, while solid arrows show a flow of control signals and parameters.

The operation for controlling a print position of this invention will now be described with reference to FIG. 3 and FIGS. 4A and 4B.

Figure 3:
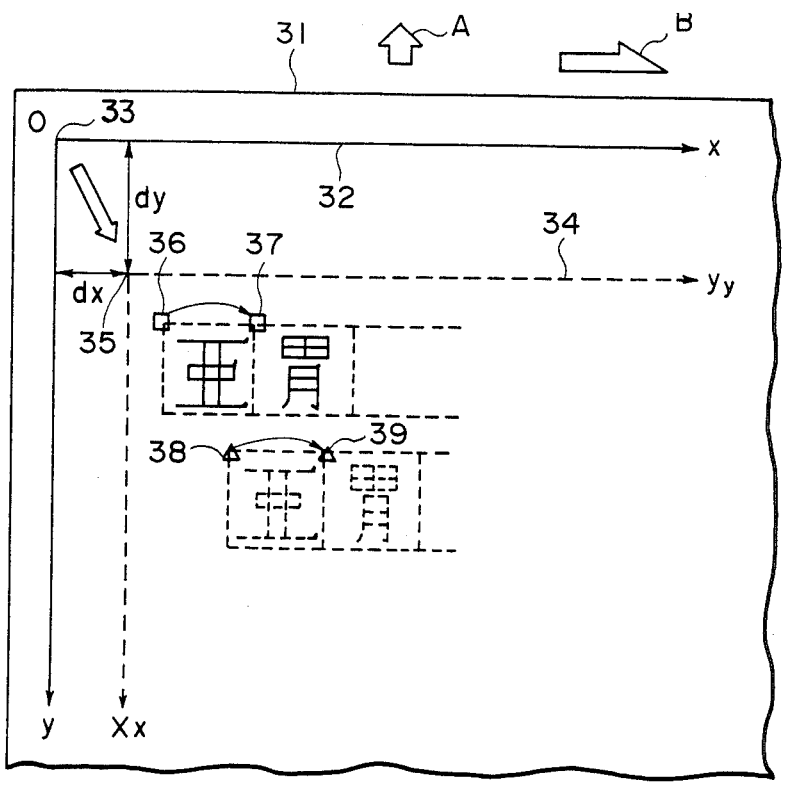
FIG. 3 is a view used for explaining the operation of moving a print position of an image on a recording paper.

FIG. 3 is a view used for explaining the operation for moving a print position of an image on a recording paper. Reference number 31 denotes an outer edge of a recording paper. Reference number 32 denotes XY coordinate axes which are used as a reference of a print position on a recording paper. Reference number 33 denotes an origin of the XY coordinate axes 32. Reference number 34 denotes XxYy coorinate axes obtained by moving the origin of the XY coordinate axes 32. Reference number 35 denotes an origin of the XxYy coordinate axes 34. Reference number 36 denotes a print position, for example, of a character " 王 " (semi-) designated by input data. Reference number 37 denotes a print position of a character " 腹 " (stomach) to be printed after the character " 王 " is printed at the print position 36. Reference numbers 38 and 39 denote print positions of the characters " 王 " and " 腹 " after the image is moved. An arrow A in the Figure shows the recording paper feed direction, and an arrow B shows the scan direction of the scaner 5.

If an image is to be printed without being moved to another printing area, e.g., if it is found by the analysis of the data in the input buffer 22 that the print position 36 is being stored in the CAP register 27 as a CAP information, then, the H and V registers 28 and 29 are set at "0".

After printing of the character " 王 " at the print position 36, the input data representative of the character " 王 " is analyzed to renew the data record by adding print position 36 information and a character code " 王 ". Thereafter, the print position moves from the position 36 to the position 37 by an amount corresponding to the width of the character " 王 " in the X direction. Namely, the contents of the CAP register 27 change to the XY coordinates of the print position 37. The above operations continue for all the character codes of the input data, with the print position being changed by one character width at a time. In the above operations, it is assumed that the characters are printed from left to right on a recording paper.

In contrast with the above, according to the present invention, an image is printed after moving it to another printing area, if the CPU 21 decides it necessary to move an image. Based on a detection signal 11a (representative of the presence or absence of a hole, and of the hole position) sent from the binding hole sensor 11, page status and other information, the CPU 21, if it determines a move is necessary, writes a move amount in the scan direction B to the H offset register 28, and a move amount in the direction (along Y axis) opposite to the recording paper feed direction A to the v offset register 29. With the move amounts being set in the H and V offset registers 28 and 29, the CPU 21 analyzes the input data and renews the CAP. For instance, assuming that the CAP prior to moving an image is the print position 36, the move amounts in the H and V offset registers 28 and 29 are added respectively to the X and Y coordinate values in the CAP register 27, to thereby set in the CAP register the print position 38 for example and move the print position thereto as shown in FIG. 3. As above, a print position of an image can be moved by a desired amount independently in the direction (along Y axis) opposite to the recording paper feed direction A and in the scan direction B, by writing the desired move amounts to the H and v offset registers 28 and 29.

Figure 4A:
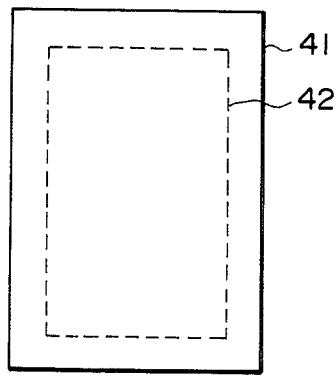
FIGS. 4A and 4B are views used for explaining the operation of moving a printing area according to the present invention.
Figure 4B:
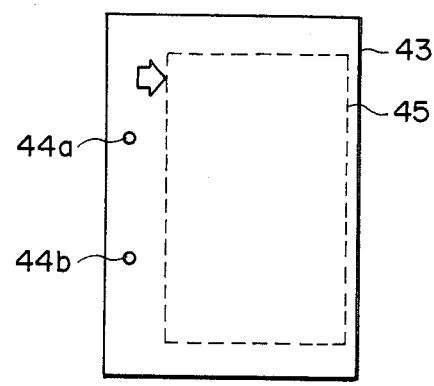

FIGS. 4A and 4B are views used for explaining the operation for moving an image printing area according to the present invention.

In FIG. 4A, reference number 41 denotes a recording paper without a binding hole, and reference number 42 denotes a printing area (indicated by a broken line) of the recording paper 41, located at the center thereof.

In FIG. 4B, reference number 43 denotes a recording paper with binding holes 44a and 44b. Reference number 45 denotes a printing area (indicated by a broken line) of the recording paper, moved parallel to the frame of the recording paper by a predetermined amount so as not to overlap the printing area with the holes 44a and 44b.

As the binding hole sensor 11 detects the positions of the binding holes 44a and 44b of a recording paper 43 under feeding operation, a detection signal 11a is output to the CPU 21. Then, the CPU 21 sets the move amounts for moving to the printing area 45 outside the binding holes 44a and 44b to the H and V offset registers 28 and 29, to thereby move the printing area 42 to the printing area 45.

Next, the record processing by the recording apparatus of this embodiment will be described with reference to FIGS. 5A to 5C.

Figure 5B:
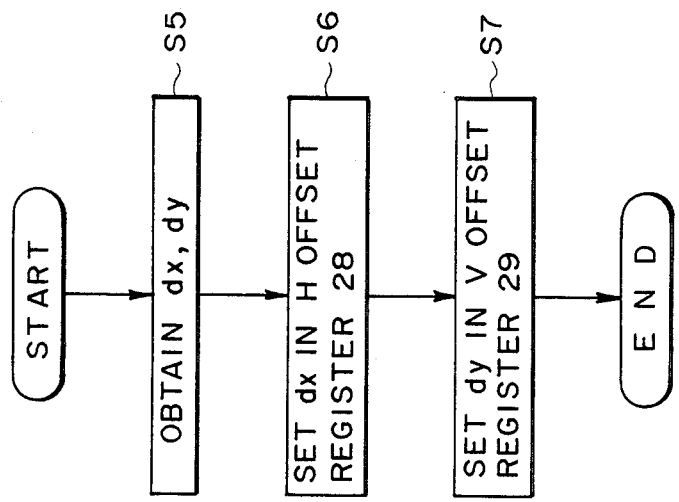
FIG. 5B is a flow chart used for explaining the registering operation of the H and V offset registers used in FIG. 5A.
Figure 5A:
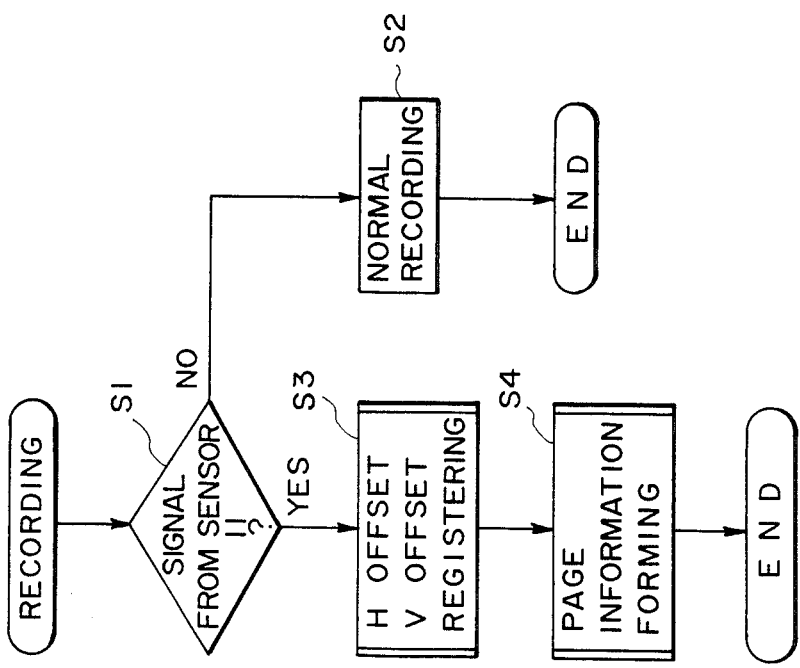
FIG. 5A is a flow chart showing the overall operation of record control processing.

FIG. 5A is a flow chart used for explaining the overall operation of the record processing, which includes steps S1 to S4.

The CPU 21 detects if there is a detection signal from the binding hole sensor 11 when the record processing starts (S1). If the CPU 21 does not detect a detection signal and hence a binding hole, a normal recording processing without considering binding holes is executed (S2). If the CPU 21 detects a detection signal and hence detection holes, the flow advances to the H and V offset registering processing routine (S3). After completion of step S3, the flow advances to the page information formation processing routine (S4). After the end of step S4, the record processing is terminated.

FIG. 5B is a flow chart used for explaining the operation of the H and V offset registering processing, which includes steps S5 to S7.

The CPU 21 analyzes the detection signal 11 from the binding hole sensor 11 to obtain the image move amounts dx and dy respectively in the X and Y directions based on the presence/absence and positions of binding holes (S5). The move amounts dx and dy in the X and Y directions may previously be stored in an internal RAM 21a of the CPU 21 as the empirical values for each binding hole which are suitable for obtaining a balanced printing area. Alternatively, since the positions of binding holes are the same for a particular size of a recording paper in most cases, such hole position information (x1, y1) and (x2, Y2) may be stored in advance in the internal RAM 21a. In this case, the move amounts $dx=2\times 1$ and $dy=0$ for B5 size or $Dx=3\times 1$ and $dy=y1/5$ for A4 size may be calculated using programs. Next, the move amount dx in the X direction is set at the H offset register 28 (S6), and the move amount dy in the Y direction is set at the V offset register 29 (S7).

Next, the page information formation processing operation will be described with reference to FIG. 5C.

Figure 5C:
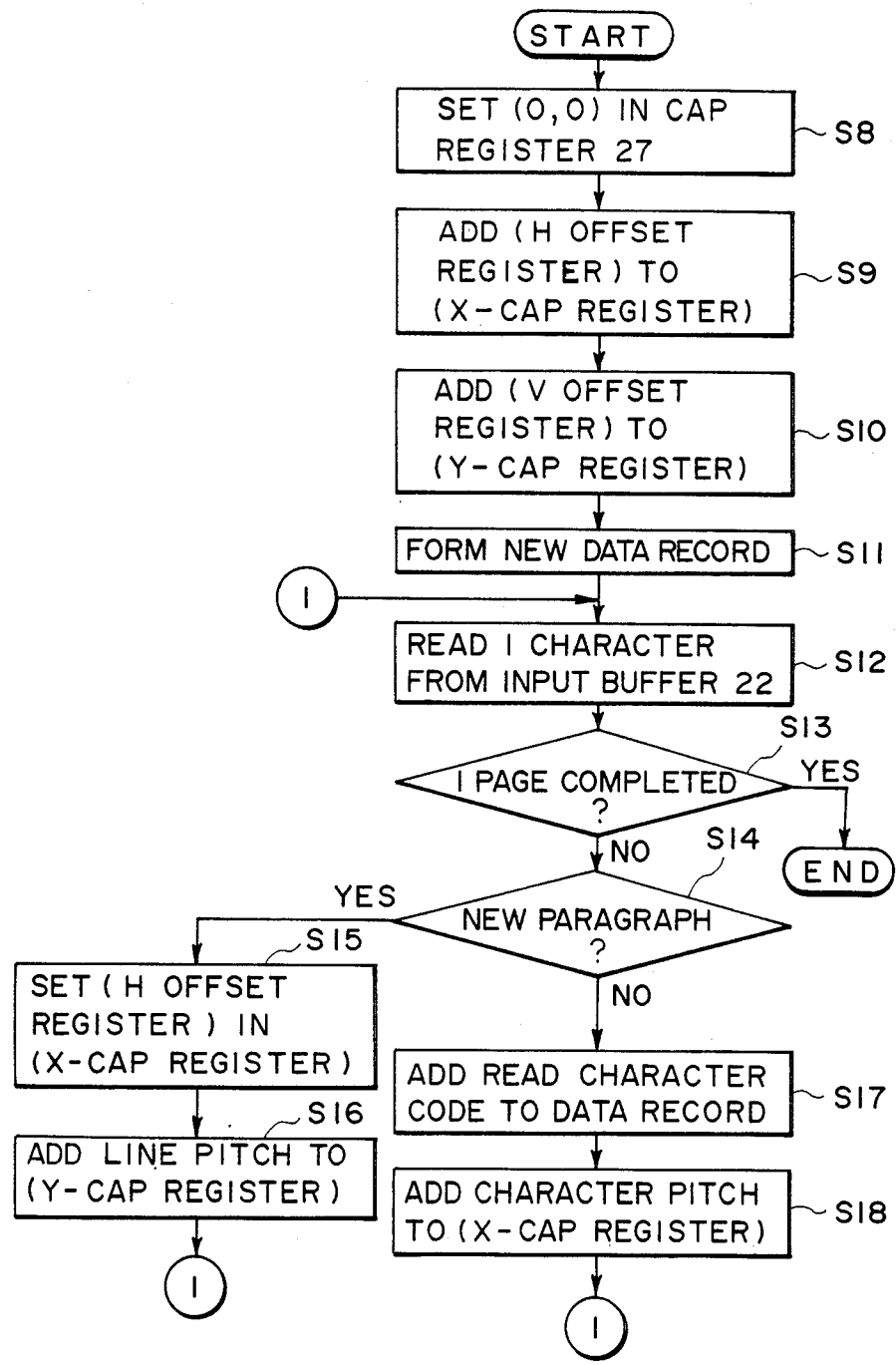
FIG. 5C is a flow chart used for explaining the operation of the page information forming processing used in FIG. 5A.
Figure 6A:
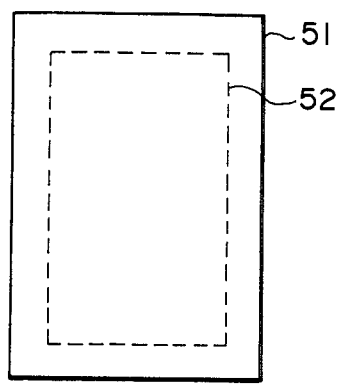
FIGS. 6A and 6B are views for explaining the conventional conservation of recording medium.
Figure 6B:
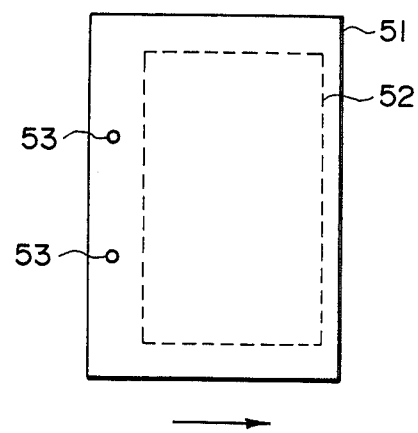

FIG. 5C is a flow chart used for explaining the page information formation operation procedure, which includes steps S8 to S18.

Prior to the page information formation, coordinates (0, 0) as a reference origin of a page are set at the CAP register 27 (S8). The contents of the H and V offset registers 28 and 29 are added respectively to the X and Y coordinates in the CAP register 27 (S9, S10). With steps S8 to S10, an origin of a page after moving an image on the page, has been set at the CAP register 27. Particularly, the above operations correspond to a move of the origin 33 to the origin 35 shown in FIG. 3, and the contents of the CAP register 27 correspond to the coordinates of the origin 35 on the XY corrdinate axes 32. Subsequently, a new data record is formed in the page buffer 23 based on the control information in the input buffer 22 (S11). The data record means character information of one line.

Next, the CPU 21 reads a character code for one character from the input buffer 22 (S12). The CPU 21 judges if character information for one page has been read (S13). If read, the control operation stops. If not, it is judged if a line feeding is carried out or not (S14). If affirmative, the contents of the H offset register is set as the X coordinate value of the CAP register 27 (S15), and a line pitch stored in the RAM 21a is added to the Y coordinate value of the CAP register (S16) to return to step S12.

If negative at step S14 judgement, the data record is added with a character code read from the input buffer 22 at step S12 (S17). Next, a character pitch stored in the RAM 21a is added to the X coordinate value of the CAP register 27 (S18) to indicate the next print position. Then, the flow returns to step S12.

As described so far, the recording apparatus of this invention comprises binding hole detecting means for detecting a punched binding hole of a recording medium, and print control means for moving a printing area of said recording medium by a predetermined amount from said binding hole. Therefore, by detecting the binding holes of recording paper during feeding operation, an image printing area can be moved to another proper area in accordance with the binding hole positions. Thus, an image recorded on bound recording paper is not cut away by the binding holes, and can be printed with a good outward appearance.

I claim:

1. A recording apparatus comprising:
   record means for recording an image on a recording medium;
   detecting means for detecting a binding hole of the recording medium; and
   record control means responsive to a detection of the binding hole by said detection means for causing said record means to record the image on the recording medium such that the image is not cut by the binding hole.

2. A recording apparatus according to claim 1, further comprising storage means for storing an amount by which the image is to be moved relative to a reference position of the image on the recording medium, said record control means, responsive to a detection of the binding hole by said detection means, moving the image from the reference position by the amount stored in said storage means and recording the image on the recording medium.

3. A recording apparatus according to claim 1, further comprising storage means for storing position coordinates of the binding hole relative to a reference position of the recording medium, said record control means, responsive to a detection of the binding hole by said detection means, calculating an amount by which the image is to be moved based on the position coordinates of the binding hole, moving the image from the reference position by the calculated amount, and recording the image on the recording medium.

4. A recording apparatus according to claim 2 or 3, further including reference position storage means for storing a reference position on the recording medium.

5. A recording apparatus comprising:
   record means for recording an image on a recording medium;
   detection means for detecting a binding hole of the recording medium;
   reference position coordinate storage means for storing reference position coordinates of the image on the recording medium;
   move amount storage means for storing move amounts dx and dy of the image relative to the recording medium, respectively in the horizontal direction (X axis direction) and in the vertical direction (Y axis direction); and
   record control means responsive to a detection of the binding hole by said detection means for moving the reference position coordinate stored in said reference position coordinates storage means to (dx, dy) and recording the image on the recording medium.

6. A recording apparatus according to claim 5, wherein, when no binding hole is detected by said detection means, said record control means records the image in accordance with the reference position coordinates stored in said reference position coordinate storage means.

7. A recording apparatus comprising:
   record means for recording an image on a recording medium;
   detection means for detecting a binding hole of the recording medium;
   reference position coordinate storage means for storing reference position coordinates of the image relative to the recording medium;
   move amount storage means for storing a move amount dx of the image relative to the recording medium in a horizontal direction (x axis direction); and
   record control means responsive to a detection of the binding hole by said detection means for moving the reference position coordinates stored in said reference position coordinate storage means to dx and recording the image on the recording medium.

8. A recording apparatus according to claim 7, wherein, when no binding hole is detected by said detection means, said record control means records the image in accordance with the reference position coordinates stored in said reference position coordinate storage means.

9. A recording apparatus comprising:
record means for recording an image on a recording medium;
detection means for detecting a binding hole of the recording medium;
reference position coordinate storage means for storing reference position coordinates of the image relative to the recording medium;
move amount storage means for storing a move amount dy of the image relative to the recording medium in a vertical direction (y axis direction); and
record control means responsive to a detection of the binding hole by said detection means for moving the reference position coordinates stored in said reference position coordinate storage means to dy and recording the image on the recording medium.

10. A recording apparatus according to claim 9, wherein, when no binding hole is detected by said detection means, said record control means records the image in accordance with the reference position coordinates stored in said reference position coordinate storage means.

* * * * *

UNITED STATES PATENT AND TRADEMARK OFFICE
CERTIFICATE OF CORRECTION

PATENT NO. : 4,786,921
DATED : November 22, 1988
INVENTOR(S) : YASHUHITO SUZUKI

Page 1 of 3

It is certified that error appears in the above-identified patent and that said Letters Patent is hereby corrected as shown below:

AT [56] IN REFERENCES CITED

```
    U.S. Patent Documents,
    "4,536,078   8/1985   Ziehn" should read
    --4,536,078  8/1985   Ziehm--.
```

COLUMN 1

```
    Line 20, "or" should read --of--.
    Line 44, "holes" should read --holes 53--.
    Line 63, "preventing" should read --providing--.
```

COLUMN 2

```
    Line 33, "of recording" should read --of the recording--.
    Line 43, "drum 6" should read --drum 5--.
    Line 52, "drum 6." should read --drum 5.--.
    Line 57, "control boar 1." should read
             --control board 1.--.
    Line 60, "CPU 1" should read --CPU 21--.
    Line 66, "printed" should read --printing--.
```

COLUMN 3

```
    Line 2,  "converst" should read --converts--.
    Line 28, "coorinate" should read --coordinate--.
    Line 40, "scaner 5." should read --scanner 5.--.
```

UNITED STATES PATENT AND TRADEMARK OFFICE
CERTIFICATE OF CORRECTION

PATENT NO. : 4,786,921

DATED : November 22, 1988

INVENTOR(S) : YASHUHITO SUZUKI

It is certified that error appears in the above-identified patent and that said Letters Patent is hereby corrected as shown below:

COLUMN 4

Line 3, "v offset register" should read --V offset register--.
    Line 4, "being" should be deleted.
    Line 17, "v offest registers 28" should read --V offset registers 28--.
    Line 34, "under" should read --during--.
    Line 60, "detection signal 11" should read --detection signal 11a--.

COLUMN 5

Line 5, "Dx=3X1" should read --dx=3X1--.
    Line 26, "XY corrdinate" should read --XY coordinate--.

COLUMN 6

Line 40, "coordinate" should read --coordinates--.
    Line 41, "coordinates" should read --coordinate--.
    Line 60, "(x axis" should read --(X axis--.

UNITED STATES PATENT AND TRADEMARK OFFICE
CERTIFICATE OF CORRECTION

PATENT NO. : 4,786,921

DATED : November 22, 1988

INVENTOR(S) : YASHUHITO SUZUKI

It is certified that error appears in the above-identified patent and that said Letters Patent is hereby corrected as shown below:

COLUMN 8

Line 1, "(y axis" should read --(Y axis--.

Signed and Sealed this

Eighteenth Day of July, 1989

Attest:

DONALD J. QUIGG

Attesting Officer

Commissioner of Patents and Trademarks